US008046008B2

(12) United States Patent
Park et al.

(10) Patent No.: US 8,046,008 B2
(45) Date of Patent: Oct. 25, 2011

(54) METHOD FOR TRANSMITTING AND RECORDING SCHEDULE USING SHORT MESSAGE SERVICE

(75) Inventors: Sang-Yong Park, Seoul (KR); Jeong-Gyu Jin, Suwon-si (KR); Hyun-Jin Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 1625 days.

(21) Appl. No.: 10/663,034

(22) Filed: Sep. 15, 2003

(65) Prior Publication Data
US 2004/0196866 A1 Oct. 7, 2004

(30) Foreign Application Priority Data

Sep. 16, 2002 (KR) .................. 10-2002-0056167
Sep. 9, 2003 (KR) .................. 10-2003-0063340

(51) Int. Cl.
*H04W 4/00* (2009.01)
(52) U.S. Cl. .................. 455/466; 455/412.1; 455/412.2; 455/414.1
(58) Field of Classification Search ........ 455/412.1–445
See application file for complete search history.

(56) References Cited

U.S. PATENT DOCUMENTS

| 5,638,450 | A  | * | 6/1997  | Robson .................. 340/7.21 |
| 6,078,820 | A  | * | 6/2000  | Wells et al. .................. 455/466 |
| 7,088,990 | B1 | * | 8/2006  | Isomursu et al. ......... 455/412.1 |
| 2001/0041560 | A1 | * | 11/2001 | Tarkiainen et al. .......... 455/414 |
| 2001/0054072 | A1 | * | 12/2001 | Discolo et al. ................ 709/206 |
| 2002/0032595 | A1 |   | 3/2002  | Hundscheidt et al. |
| 2002/0152220 | A1 | * | 10/2002 | Kang et al. .................... 707/101 |
| 2003/0018816 | A1 | * | 1/2003  | Godfrey et al. ............... 709/246 |
| 2003/0100336 | A1 | * | 5/2003  | Cronin ......................... 455/556 |
| 2004/0203946 | A1 | * | 10/2004 | Wu et al. ...................... 455/466 |

FOREIGN PATENT DOCUMENTS

| CN | 1346199       | 4/2002 |
| CN | 1472947       | 2/2004 |
| EP | 1197901       | 4/2002 |
| EP | 1 209 932     | 5/2002 |
| JP | 2001204076 (A) | 7/2001 |

(Continued)

OTHER PUBLICATIONS

International Search Report dated Dec. 31, 2003 issued in a counterpart application, namely, Appln. No. PCT/KR03/01885.

*Primary Examiner* — Dai A Phuong
(74) *Attorney, Agent, or Firm* — The Farrell Law Firm, P.C.

(57) ABSTRACT

Disclosed is a method for transmitting a common schedule message to a plurality of mobile terminals using a short message service (SMS) in a mobile terminal having an SMS function and a schedule function, and enabling a mobile terminal receiving the schedule message to record the received schedule message therein as a schedule. If a user selects a schedule transmission for transmitting a schedule registered in the mobile terminal to another mobile terminal, the mobile terminal converts a data format for the schedule into a data format of a schedule-recordable SMS message, and then transmits the schedule-recordable SMS message. To record a schedule, the mobile terminal receiving a schedule message converts a data format of the received SMS message into a format of schedule-recordable data and records the converted data therein as a schedule, if schedule recording is selected by the user.

19 Claims, 14 Drawing Sheets

FOREIGN PATENT DOCUMENTS

| | | |
|---|---|---|
| JP | 2001-251395 | 9/2001 |
| KR | 100257563 B1 | 2/2000 |
| KR | 2001-0035423 | 5/2001 |
| KR | 1020010035348 A | 7/2001 |
| KR | 2002-0047943 | 6/2002 |
| KR | 2003-0052030 | 6/2003 |
| KR | 100381362 B1 | 9/2003 |
| WO | WO 01/49051 | 7/2001 |
| WO | WO 02/32171 | 4/2002 |

\* cited by examiner (a)

(b)

(c)

METHOD FOR TRANSMITTING AND RECORDING SCHEDULE USING SHORT MESSAGE SERVICE

BACKGROUND OF THE INVENTION

1. Field of the Invention

The present invention relates generally to a user interface for a mobile terminal having a schedule function, and in particular, to a method for managing schedules.

2. Description of the Related Art

Commonly, a user always carries a mobile terminal with him or her, and frequently uses an electronic diary function, i.e., a schedule management function, among additional functions of the mobile terminal. In such a schedule management function, if a user selects a menu and then sets a date and a time of a schedule and an alert method, a mobile terminal raises an alert at the set time of the schedule in the alert method set by the user, and displays the recorded schedule contents for the user. In this way, the user can conveniently be notified of set schedule events.

Such a schedule function is chiefly useful for recording, as a schedule, the contents that the user desires to memorize, such as friends or parents' birthdays or various anniversaries, and reminding the user of such information that the user may otherwise forget. Among the contents that the user desires to record as a schedule, such schedules as festive days, election days, team dining, team meetings, friendship meetings, etc. are applied in common to the persons belonging to a particular group. Conventionally, in the case where one group has a common schedule, constituent members of the group must individually record the schedule in their own mobile terminals, even though the schedule is common to them.

Generally, the schedule being common to the persons belonging to a particular group can be notified over a telephone call or through a short message service (SMS). For example, when a certain group has a meeting, the SMS service is used to provide notice the meeting. Currently, the SMS service sends only text messages input by the user to the constituent members. In that case, some constituent members will manage their schedules by memorizing the message contents and inputting the contents to a scheduler or a personal information manager (PIM), while other constituent members may forget the contents after simply reading them. In some cases, the user may delete an SMS message by mistake and thus forget important schedule information. Therefore, when schedule information included in a received SMS message is important information, the user must set and manage a schedule or alert function after inconveniently inputting the schedule information to the scheduler or the PIM in person.

As described above, conventionally, users must annoyingly individually input even the common schedule in their own mobile terminals. Particularly, in the case where a common schedule is received with an SMS message, if the received SMS message has information on the schedule or special information that must be provided to users, the users must, inconveniently, each input the information in their individual scheduler or the PIM. In addition, the users may lose important information if they inadvertently delete the received SMS message. In order to solve such annoyance, a method for recording the contents of a common schedule in a convenient way is required.

SUMMARY OF THE INVENTION

It is, therefore, an object of the present invention to provide a method for transmitting a common schedule message to a plurality of users' mobile terminals using an SMS service and enabling mobile terminals receiving the schedule message to record the received schedule message as a schedule.

It is another object of the present invention to provide a method for automatically setting an alert according to schedule information included in an SMS message using an SMS service, thereby to inform users of a schedule time.

To achieve the above and other objects, there is provided a schedule transmission method including the steps of: determining whether a schedule transmission input for transmitting a schedule recorded in the mobile terminal to another mobile terminal is selected by a user; and if the schedule transmission input is selected, converting a data format of the schedule into a data format of a schedule-recordable SMS message and transmitting the schedule-recordable SMS message to said another mobile terminal.

To achieve the above and other objects, there is provided a schedule recording method including the steps of: upon receiving an SMS message, determining whether the received SMS message is a common SMS message or a schedule-recordable message; if the received SMS message is a schedule-recordable message, determining whether a schedule recording key is input; and if the schedule recording key is input, converting a data format of the received SMS message into a format of data recordable in a scheduler, and recording the converted data in the scheduler.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Several preferred embodiments of the present invention will now be described in detail with reference to the annexed drawings. In the following description, a detailed description of known functions and configurations incorporated herein has been omitted for conciseness.

Figure 1:
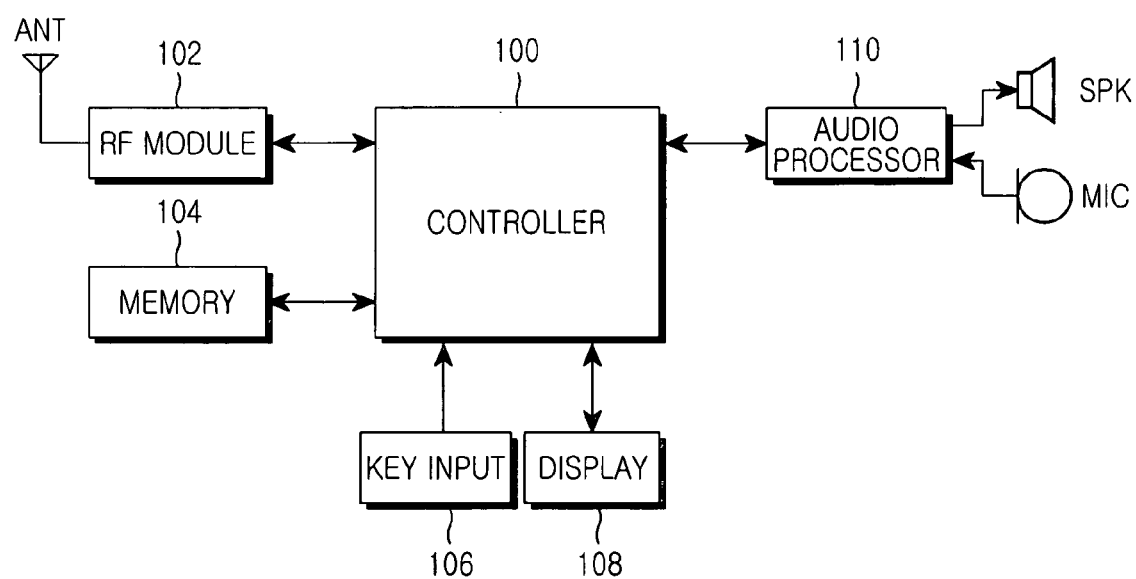
FIG. 1 is a block diagram of a mobile terminal to which the present invention is applied.

FIG. 1 is a block diagram of a mobile terminal to which the present invention is applied. In FIG. 1, a controller 100 handles and controls a telephone call and message or data communication. In addition to ordinary functions, the controller 100 has a function of transmitting a schedule message using an SMS service and recording a received schedule message in a scheduler according to the present invention. A radio frequency (RF) module 102 is controlled by the controller 100. If a radio signal is received over a radio channel via an antenna ANT, the RF module 102 down-converts the received radio signal, distinguishes its data type, and provides the resultant data to the controller 100. The data provided from the RF module 102 to the controller 100 is text data, or a paging signal and a signaling signal received over a paging channel. In addition, data provided to an audio processor 110 is audio data received when a voice call is set up. Further, the RF module 102 up-converts data received from the controller 100 and coded audio data received from the audio processor 110 into a radio signal, and transmits the radio signal via the antenna ANT. A memory 104 stores a program performed in the controller 100, and temporarily stores data processed by the program. In addition, the memory 104 stores a received SMS message and a telephone number table. The memory 104 is comprised of a ROM (Read Only Memory) for storing an operation program, an electrically erasable and programmable ROM (EEPROM), and a RAM (Random Access Memory). A key input section 106 has a plurality of alphanumeric keys and function keys, and provides key data generated by key manipulation to the controller 100. A display 108 displays various states of the mobile terminal under the control of the controller 100. The audio processor 110 is generally comprised of a vocoder, and controlled by the controller 100. The audio processor 110 decodes coded audio data received from the RF module 102, converts the decoded audio data into an electric audio signal, and outputs the electric audio signal to a speaker SPK. The speaker SPK then converts the received electric audio signal into audible sound. In addition, the audio processor 110 encodes an electric audio signal received from a microphone MIC, and provides the coded electric audio signal to the RF module 102.

Figure 2:
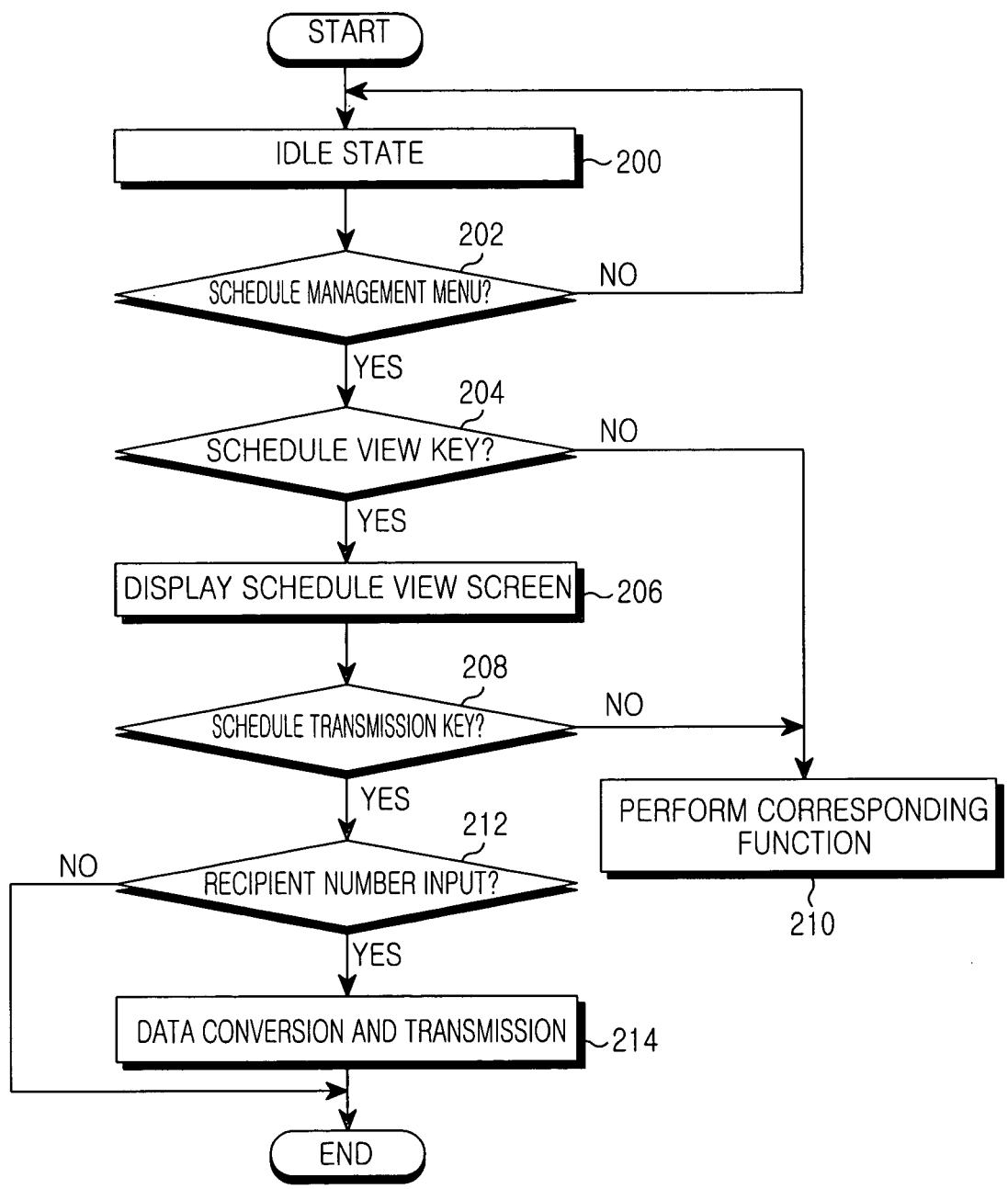
FIG. 2 is a flowchart for transmitting a schedule using an SMS service according to a first embodiment of the present invention.

FIG. 2 is a flowchart for transmitting a schedule using an SMS message according to a first embodiment of the present invention. With reference to FIG. 2, a description will now be made of an operation of transmitting a schedule stored in a mobile terminal to other mobile terminals according to the present invention.

Figure 5A:
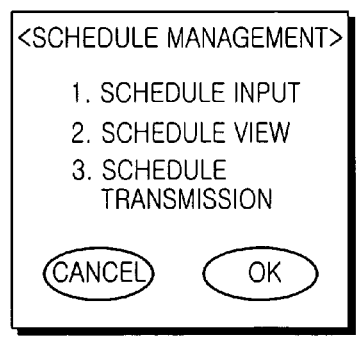
FIGS. 5A to 5E illustrate screens for transmitting a schedule recorded in a mobile terminal and recording a received schedule message according to the first embodiment of the present invention.

When a mobile terminal is powered on, a controller 100 holds an idle state in step 200, and then determines in step 202 whether a Schedule Management menu is selected. The Schedule Management menu is generally selected by a user of the mobile terminal to record a schedule or to view a recorded schedule. A display screen for the "Schedule Management" menu is illustrated in FIG. 5A by way of example.

Figure 5B:
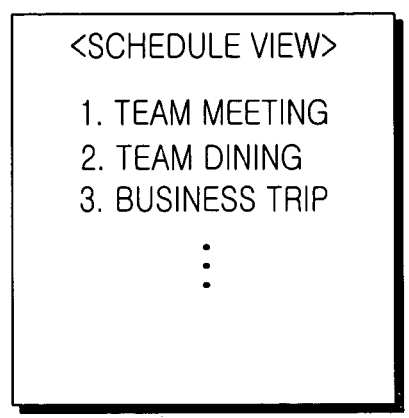
Figure 5C:
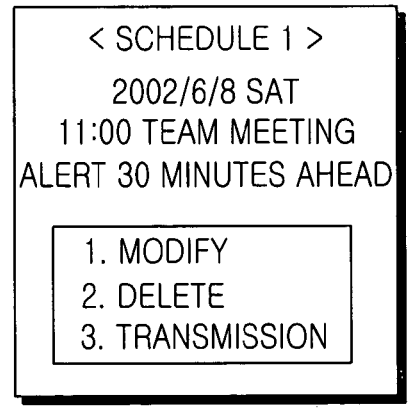

If the Schedule Management menu is selected in step 202, the controller 100 proceeds to step 204. In step 204, the controller 100 determines whether a Schedule View key is input. If a Schedule View key is input, the controller 100 proceeds to step 206 where it displays a Schedule View screen. A display screen for the "Schedule View" menu is illustrated in FIG. 5B by way of example. If "1. Team Meeting" is selected from a plurality of schedules shown in FIG. 5B, a screen of FIG. 5C is displayed. In FIG. 5C, a date and a time of the team meeting and a schedule alert time are displayed as the contents of a schedule #1. Further, FIG. 5C illustrates a menu for transmitting the schedule #1 to a plurality of mobile terminals.

Figure 5D:
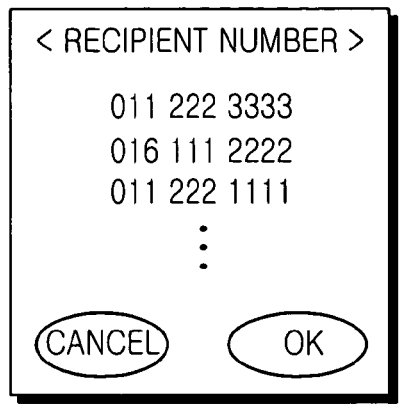

If a user desires to transmit a schedule for the team meeting to all team members in the screen of FIG. 5C, the user will select "3. Transmission" through a key input section 106. Then, the controller 100 determines in step 208 whether a Schedule Transmission key is input through the key input section 106. If a Schedule Transmission key is input, the controller 100 determines in step 212 whether a unique number of a recipient to which the schedule is to be transmitted is input by the user. FIG. 5D illustrates a screen for inputting unique numbers of recipients to which the schedule is to be transmitted.

If it is determined in step 204 that another function key rather than the Schedule View key is input, the controller 100 performs an operation corresponding thereto in step 210.

If it is determined in step 212 that inputting unique numbers of recipients to which the schedule is to be transmitted has been completed, the controller 100 proceeds to step 214 where it converts a data format of the schedule into a data format of an SMS message and then repeatedly transmits a schedule message as many times as the number of the recipients, unique numbers of whom were input by the user. Here, the "schedule message" refers to a message obtained by converting a schedule data format into an SMS data format in order to transmit a schedule.

The present invention can transmit the contents of a schedule being common to a plurality of users in the form of an SMS message by converting schedule data format into an SMS data format in the above-stated manner. Even in an active state rather than the idle state (step 200), the controller 100 can transmit the schedule through the Schedule Management menu. Further, the controller 100 can also transmit the corresponding schedule without performing the Schedule View key inputting step (step 204), and can also transmit the corresponding schedule using a telephone number recorded in the scheduler without performing the recipient number inputting step (step 212).

Figure 4:
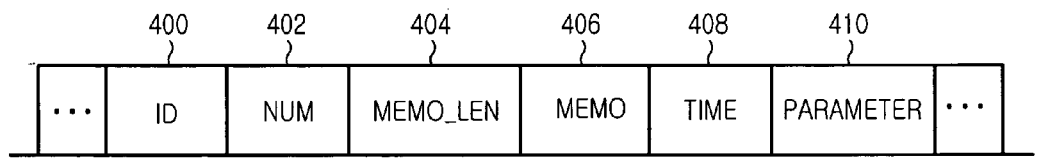
FIG. 4 illustrates a data format of an SMS message obtained by converting a data format of a schedule according to the first embodiment of the present invention.

FIG. 4 illustrates a schedule data format converted into an SMS data format. With reference to FIG. 4, a detailed description will now be made of a data format for transmitting a schedule using an SMS service. ID (Identifier) 400 distinguishes whether a currently transmitted SMS message is a common SMS message or a schedule message for schedule recording. NUM (Number) 402 indicates the numbers for the recipients to which the user desires to transmit a schedule message. That is, NUM 402 is a field that also includes the number of the recipients' numbers input by the user in step 212 of FIG. 2, MEMO_LEN (Memo_Length) 404 indicates a length of the schedule contents, MEMO 406 indicates (equal) the schedule contents, and TIME 408 is a field having information on alert date and time of the schedule desired to be recorded. In addition, PARAMETER 410 is a field indicating use and type of an alert tone. In the present invention, the controller 100 repeatedly transmits the fields 404, 406, 408 and 410 to corresponding reception mobile terminals as many times as NUM 402 in the converted SMS data format, i.e., as many times as the number of recipients, in order to transmit schedule data.

In transmitting the schedule data, a service provider is able to transmit lunar festive days, election days, etc. to its subscribers along with SMS data free of charge. In addition, a general user transmits a schedule, such as the meeting schedule recorded in FIG. 5C, to other users.

Figure 3:
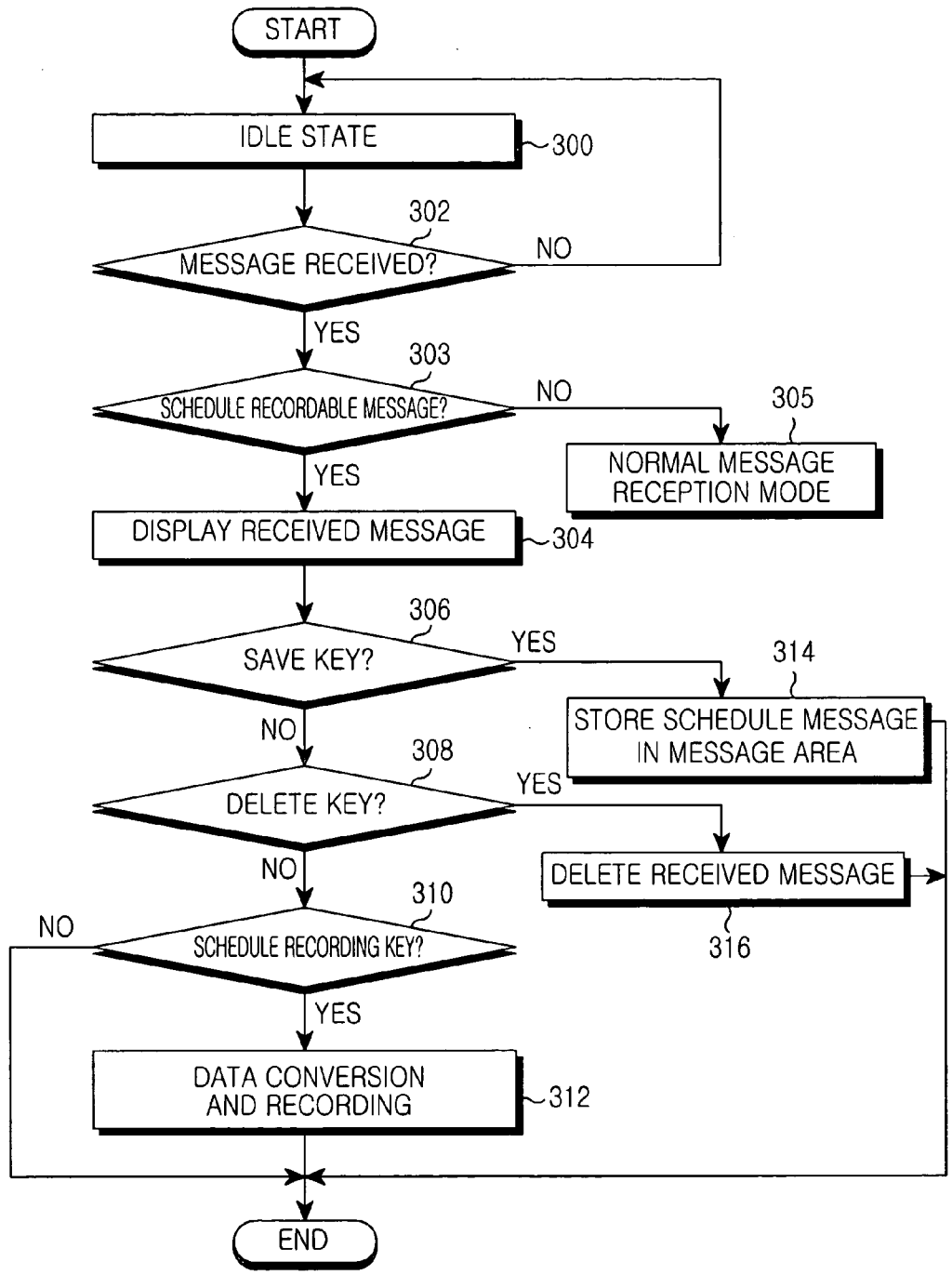
FIG. 3 is a flowchart for recording a received schedule message according to the first embodiment of the present invention.

Now, a control flow for recording a schedule message in a mobile terminal that has received the schedule message will be described with reference to FIG. 3. It will be assumed herein that the mobile terminal receiving the schedule message is similar to the mobile terminal illustrated in FIG. 1.

If the mobile terminal is powered on, the controller 100 holds an idle state in step 300, and then determines in step 302 whether a message has been received. If a message has been received, the controller 100 determines in step 303 whether the received message is a general SMS message or a schedule-recordable message. However, if it is determined in step 302 that no message has been received, the controller 100 returns to step 300 and holds the idle state.

If it is determined in step 303 that the received message is a schedule-recordable message, the controller 100 proceeds to step 304 where it displays the received message on the display 108. On the contrary, if it is determined in step 303 that the received message is a general message, the controller 100 proceeds to step 305 where it performs a general message reception mode.

Figure 5E:
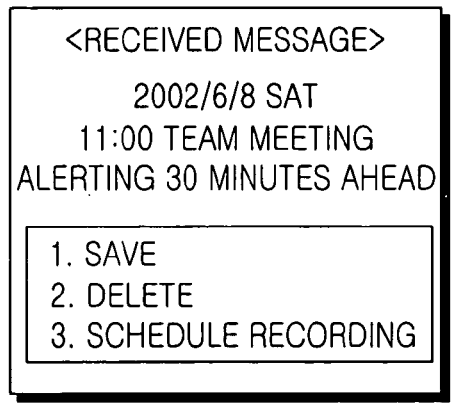

FIG. 5E illustrates a screen on which the message received in step 304 is displayed, and the screen also displays "Save," "Delete," "Schedule Recording," and "Response" menus. At this point, if it is determined in step 306 that a Save key for storing the received schedule message is input, the controller 100 proceeds to step 314 where it stores the schedule message in a message area of the memory 104. If it is determined in step 308 that a Delete key for deleting the schedule message is input, the controller 100 proceeds to step 316 where it deletes the schedule message. If it is determined in step 310 that a Schedule Recording key for recording the schedule message as a schedule is input, the controller 100 proceeds to step 312 where it converts the contents of the schedule message in the data format of FIG. 4 into a recordable data format and then records the converted data in the scheduler.

As described above, according to the present invention, a plurality of mobile terminals that have received a schedule message for schedule recording can directly record the received schedule message in their scheduler.

In addition, when transmitting the schedule message for schedule recording as shown in FIG. 2, the invention can include not only the schedule and its contents in the schedule message, but also a unique number of a reception mobile terminal and a schedule lasting time in the schedule message in the schedule recording process, before transmitting the schedule message to the reception mobile terminal. This will be described with reference to FIG. 6.

Figure 6:
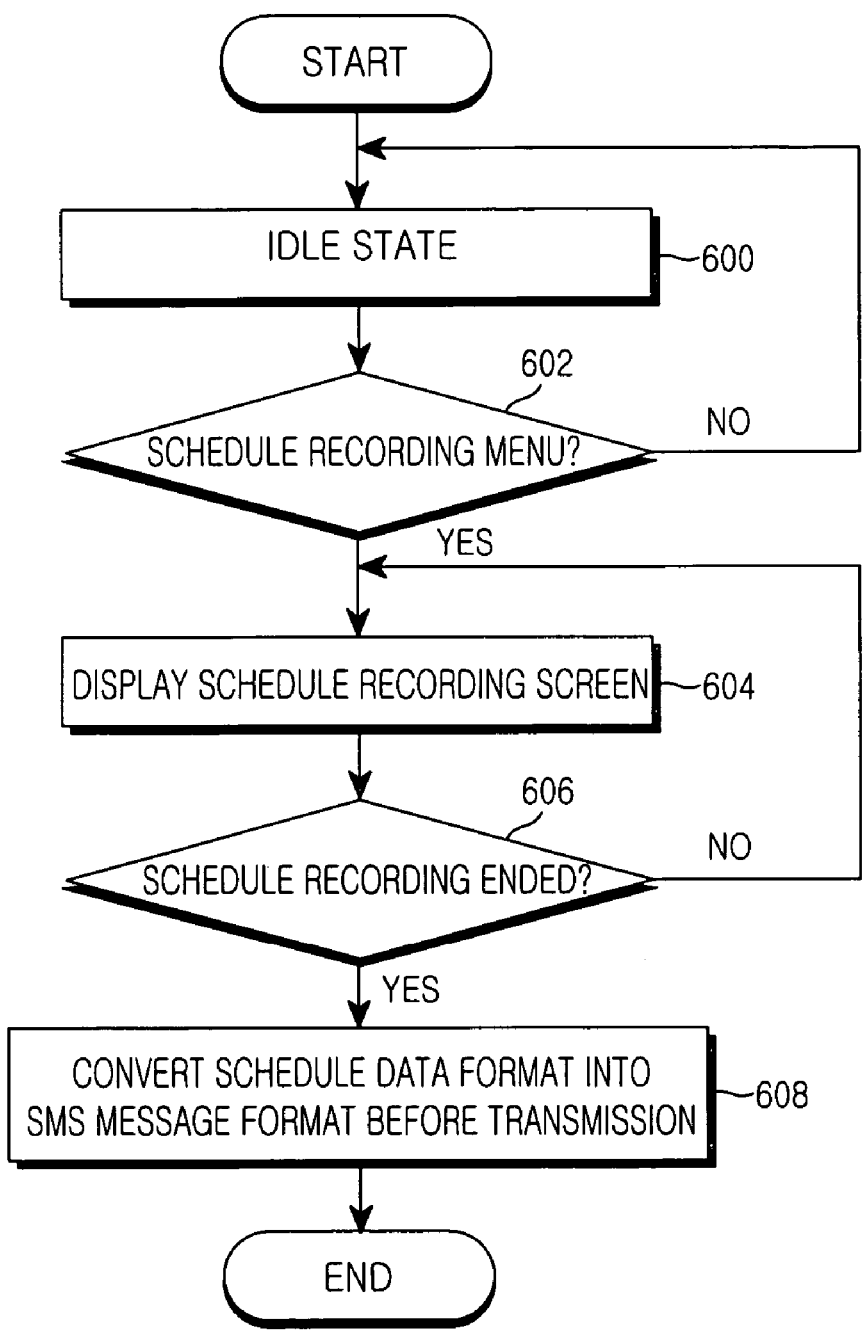
FIG. 6 is a flowchart for transmitting a schedule message using an SMS service according to a second embodiment of the present invention.
Figure 8A:
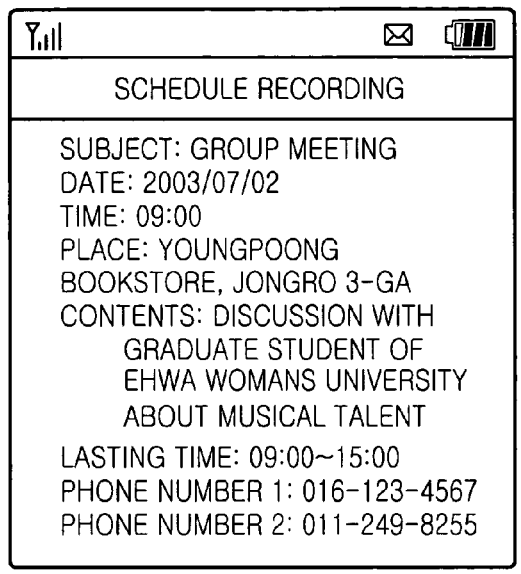
FIG. 8A illustrates a screen for displaying a schedule message to be transmitted from a mobile terminal to a reception mobile terminal according to the second embodiment of the present invention.

FIG. 6 is a flowchart for transmitting a schedule message using an SMS service according to a second embodiment of the present invention. If a Schedule Recording menu is selected in step 602 while the controller 100 holds an idle state in step 600, the controller 100 proceeds to step 604 where it displays a Schedule Recording screen. The Schedule Recording screen will be described with reference to FIG. 8A. The Schedule Recording screen displays 'Subject' summarizing the contents of a schedule such as a meeting or a conference, 'Date' and 'Time' of the schedule, 'Contents', 'Lasting Time' of the schedule, and 'Phone Number' of a reception mobile terminal. Here, the "schedule lasting time" refers to a time for which the schedule lasts. For example, if a user sets a lasting time to "9:00-15:00" in FIG. 8A, it means that a group meeting is scheduled from 9:00 to 15:00. In addition, the Schedule Recording screen can set one or more Phone Numbers. If it is determined in step 606 that setting of all schedule items shown in FIG. 8A has been completed, the controller 100 proceeds to step 608 where it converts a format of the set schedule data into an SMS data format and transmits it to a corresponding reception mobile terminal. Here, the schedule data format of FIG. 8A is converted into an SMS format of FIG. 8C. That is, 'Subject' is converted into <S> or S; 'Date' into <D> or D; 'Time' into <T> or T; 'Contents' into <C> or C; 'Lasting Time' into <L> or L; and 'Phone Numbers' of the other party into <N1> and <N2> or N1 and N2, and then transmitted to a reception mobile terminal. Upon receiving a message with specific tags such as <S> and <T>, a mobile terminal determines that the received message is a schedule message. In this case, the mobile terminal converts specific tags into schedule data and displays the schedule data.

Figure 8B:
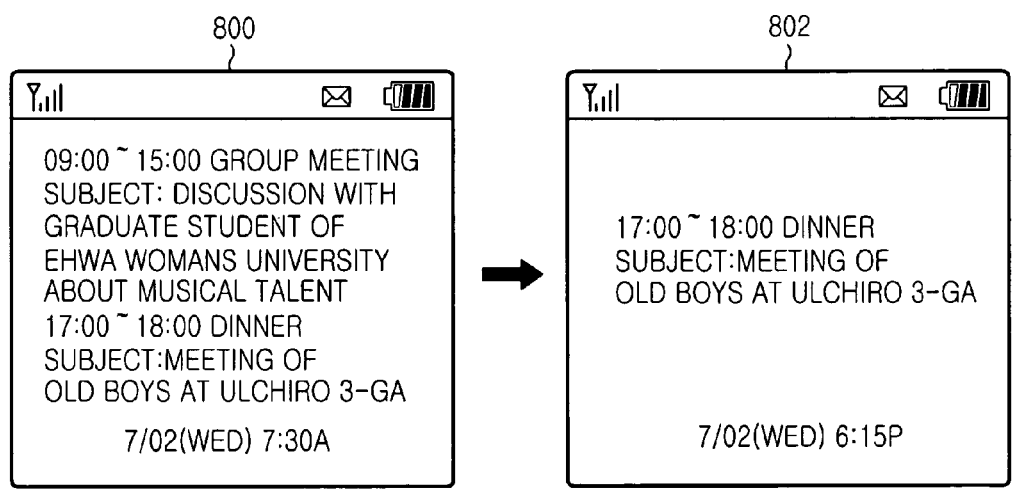
FIG. 8B illustrates an SMS message obtained by converting schedule data in order to transmit a schedule message using an SMS service according to the second embodiment of the present invention.
Figure 8C:
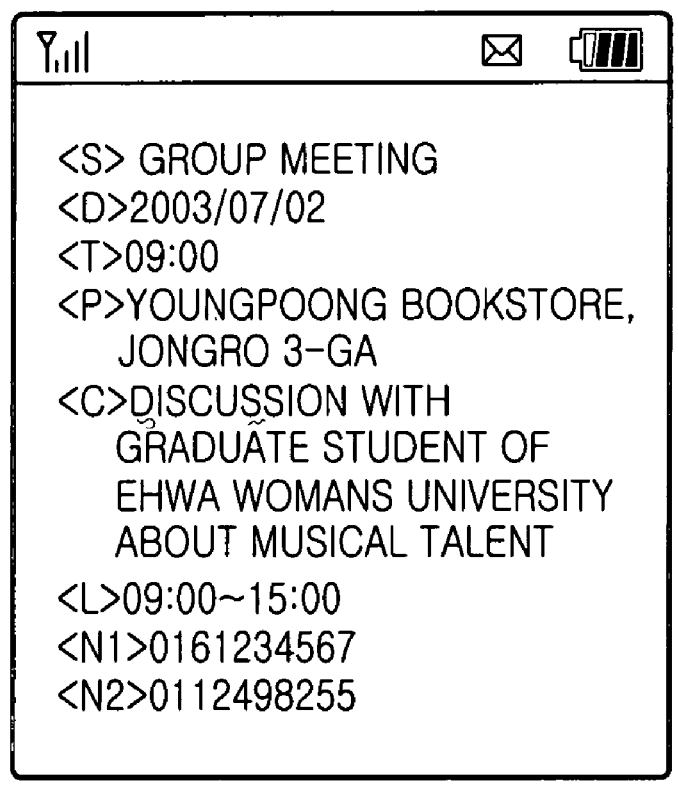
FIG. 8C illustrates schedule information displayed on a display for a lasting time according to a second embodiment of the present invention.

Although a schedule message for schedule recording can be transmitted by a mobile terminal as mentioned above, a schedule message can also be transmitted to a particular mobile terminal from a personal computer, a personal digital assistant (PDA), a smart phone, etc. through an E-mail. Even in the case where a schedule message is transmitted through an E-mail, 'Subject', 'Date', 'Time', 'Contents', 'Lasting Time' of a schedule, and 'Phone Number' of a reception mobile terminal are tagged as shown in FIG. 8C before message writing, and then transmitted to a management server that manages schedules. The management server transmits a received schedule message to a short message center (SMC) over the Internet. The "management server" refers to a screen that pops up an Internet input window, and transmitting a schedule message to the management server is equivalent to storing an input schedule message before transmission to a reception mobile terminal. The short message center then transmits the schedule message to a reception mobile terminal included in the message. That is, a mobile terminal capable of accessing the Internet, accesses the Internet, writes an HTML (Hypertext Markup Language) text on a Schedule Message Transmission screen, inputs a schedule in an SMS format, and then transmits the schedule message to a server. Upon receiving the schedule message, the server transmits an SMS message to the short message center to transmit the SMS message to the reception mobile terminal.

Upon receiving an SMS message containing the schedule information, a mobile terminal's user records or deletes a corresponding schedule in/from a scheduler of the mobile terminal through 'OK' or 'Cancel' button, and transmits a response message to the other party. At this point, by transmitting a response message to the other party, the user informs the other party transmitting the schedule message that the user has received the schedule message. When the schedule message is stored in the mobile terminal, a corresponding schedule is displayed on an external window at a schedule time, if the user selects an input for displaying a schedule on an external window. Here, the mobile terminal is set so that when a lasting time of a schedule has elapsed, the corresponding schedule is not displayed, and an internal window informs the user of existence of a schedule with an appropriate icon.

Figure 7:
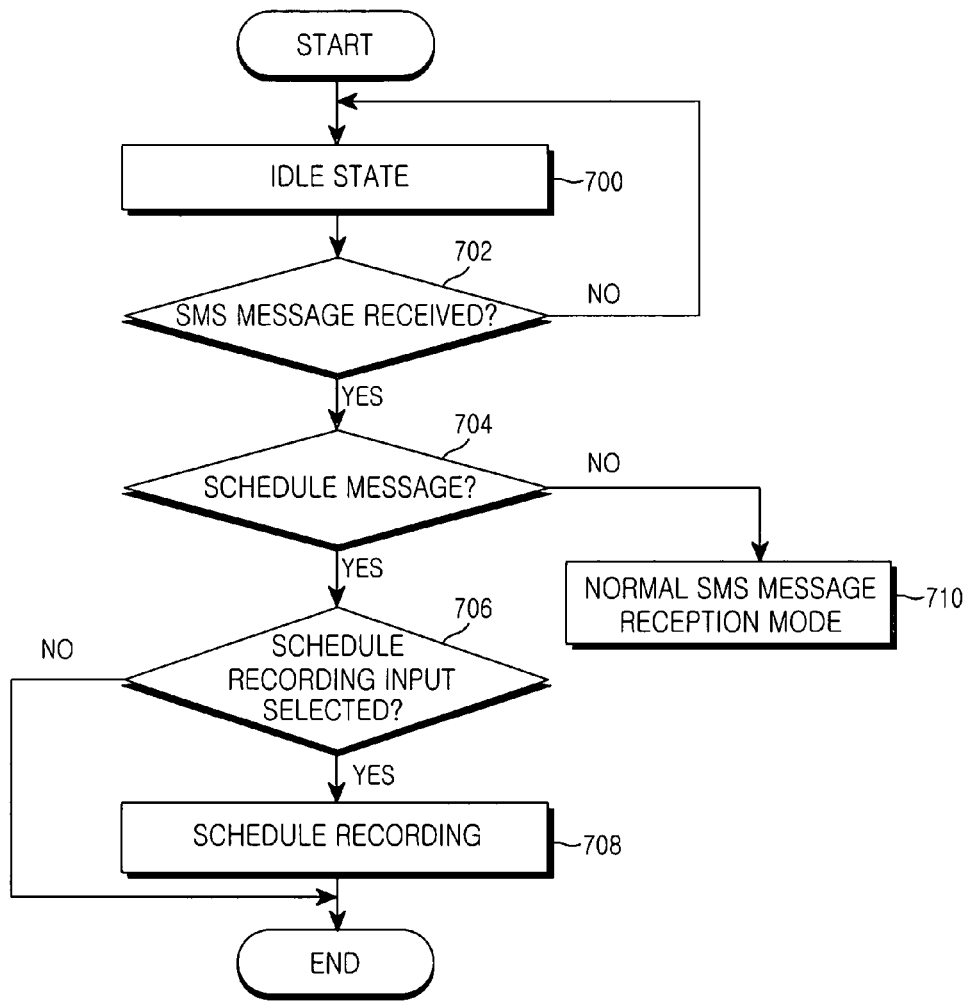
FIG. 7 is a flowchart for recording a received schedule message according to the second embodiment of the present invention.

Now, with reference to FIG. 7, a procedure for receiving a schedule message transmitted as described in conjunction with FIG. 6, and recording the received schedule message will be described. FIG. 7 is a flowchart for recording a received schedule message according to a second embodiment of the present invention.

If the controller 100 receives an SMS message in step 702 while holding an idle state in step 700, the mobile terminal 100 proceeds to step 704 where it determines whether the received SMS message is a schedule message. If the tags of FIG. 8C, indicating a schedule, are detected, the controller 100 determines that the received message is a schedule message, and then proceeds to step 706. If it is determined that the received message is not a schedule message, the controller 100 proceeds to step 710 where it performs a common SMS message reception mode. In step 706, the controller 100 determines whether an input for recording a schedule included in the SMS message is selected. If the input is selected, the controller 100 proceeds to step 708 where it records the schedule. Otherwise, the controller 100 ends the procedure.

In step 708, in order to record the schedule in the mobile terminal, the controller 100 stores the subject, date, time, place, contents and lasting time of the received schedule message in Subject <S> or S, Date <D> or D, Time <T> or T, Place <P> or P, Contents <C> or C, and Lasting Time <L> or L, respectively.

The schedule recorded in this way is displayed on the external window at a schedule time, if an input for displaying a schedule on the external window is selected by the user. Here, the mobile terminal is set so that when a lasting time of a schedule has elapsed, the corresponding schedule is not displayed, and an internal window informs the user of existence of a schedule with an appropriate icon. An exemplary method of displaying a schedule on an external window will now be described with reference to FIG. 8B. Referring to FIG. 8B, since a lasting time of a 'group meeting' is set to '9:00-15:00' and a lasting time of a 'dinner' is set to '17:00-18:00', if a current time is 7:30 AM, both the 'group meeting' and the 'dinner' are displayed as shown in a screen 800. However, in a screen 802 where the current time is 6:15 PM, the 'group meeting' is not displayed since its lasting time has elapsed, and only the 'dinner' is displayed since its lasting time has not elapsed yet.

It is also possible to notify a written schedule such as an appointment to the other party using the other party's phone number, without including a phone number of a mobile terminal among the currently used schedule recording items.

As illustrated in FIGS. 2 and 6, the present invention writes a schedule message in a schedule window which is a Schedule Recording screen, and converts the schedule message into an SMS format before transmission. In addition, a schedule message can be written in an SMS message window where an SMS message can be directly written, instead of the schedule window, before transmission. A procedure for writing a schedule message in the SMS message window will be described with reference to FIGS. 9 and 11A to 11C.

Figure 9:
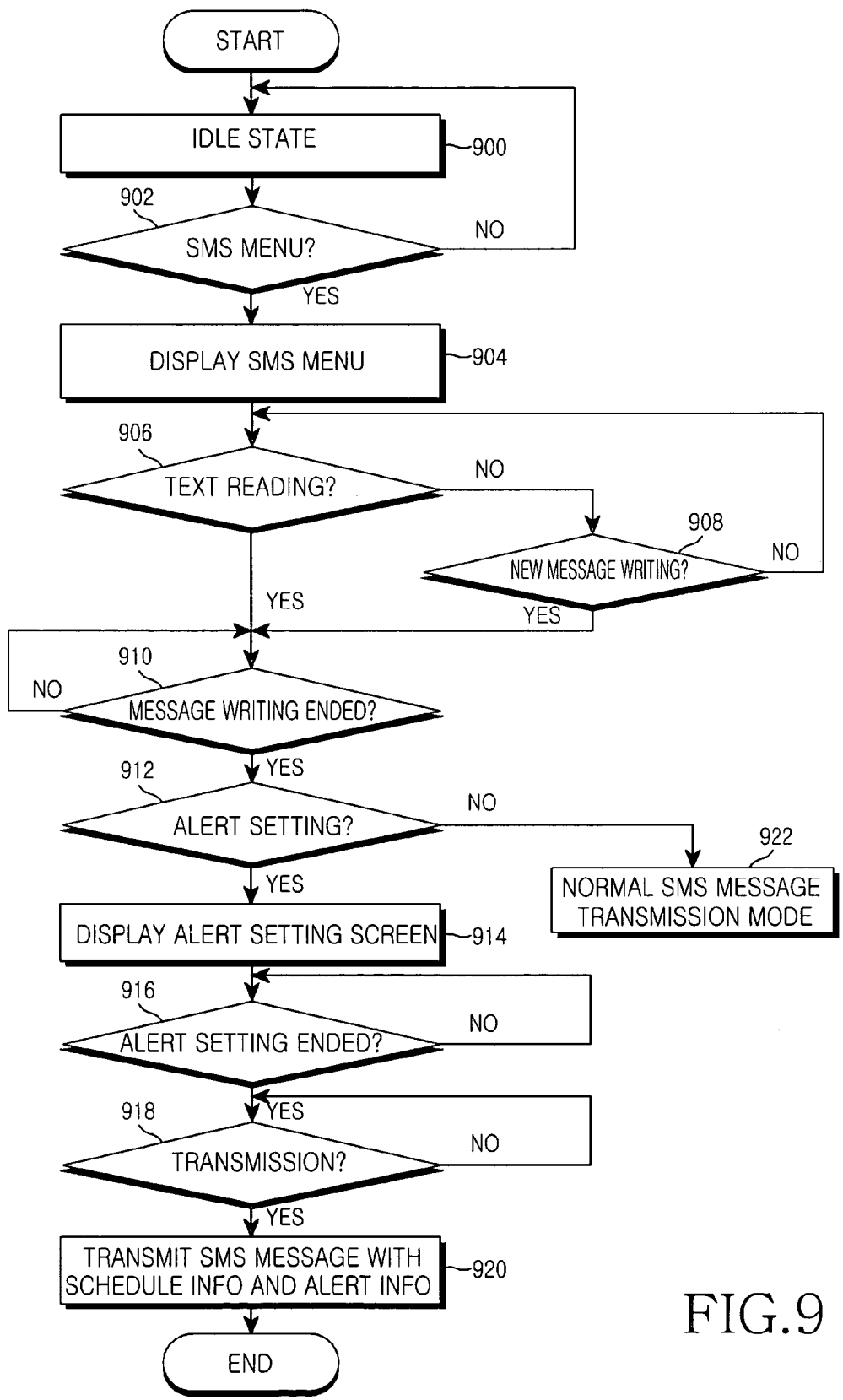
FIG. 9 is a flowchart for transmitting a schedule using an SMS service in an SMS menu according to a third embodiment of the present invention.
Figure 11:
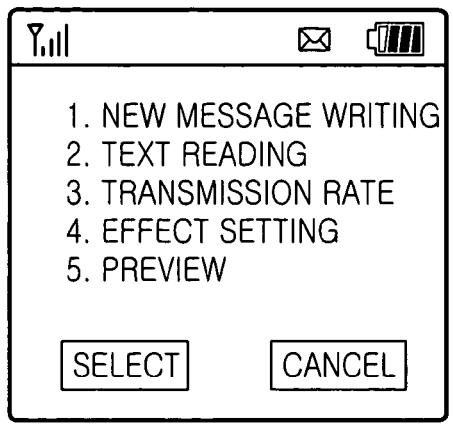
FIGS. 11A to 11C are diagrams illustrating screens for displaying various steps of a procedure for transmitting a schedule message containing schedule information and alert information according to the third embodiment of the present invention.
Figure 11:
Figure 11:
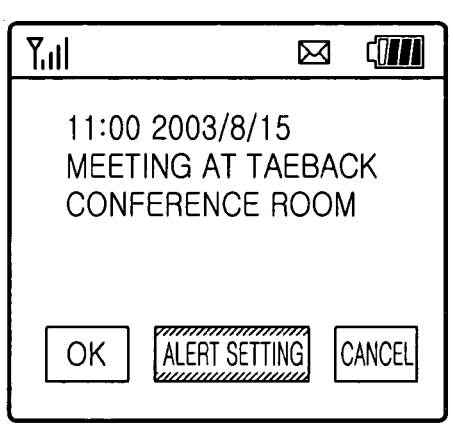
Figure 11:
Figure 11:
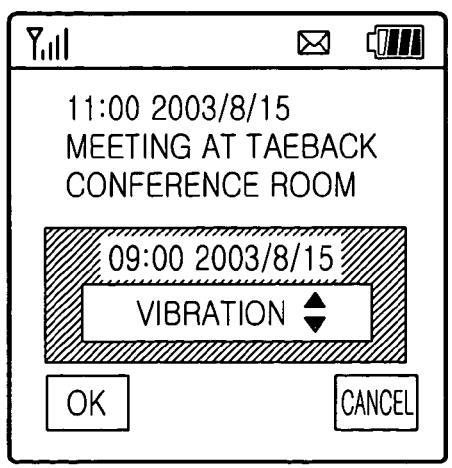

FIG. 9 is a flowchart for transmitting a schedule using an SMS service in an SMS menu according to a third embodiment of the present invention. FIGS. 11A to 11C illustrate screens for displaying various steps of a procedure for transmitting a schedule message containing schedule information and alert information according to a third embodiment of the present invention.

In order to transmit and record a schedule using an SMS service, a mobile terminal must further include an alert information recording function for recording alert information and a user interface function for analyzing and inputting the alert information, in addition to the existing SMS service. That is, when transmitting a schedule message using the SMS service, a transmission mobile terminal determines whether to set alert information for a reception mobile terminal or enable the reception mobile terminal to input the alert information. A recipient, receiving a schedule message and alert information received at the reception mobile terminal, stores the received schedule message and alert information in his mobile terminal and sets an alert.

In addition, a transmission mobile terminal requires a method in which when a transmission mobile terminal sets an effect function before transmitting an SMS message, a reception mobile terminal can determine that a schedule alert function is set in the received SMS message. In order to indicate that a schedule alert function is set in an SMS message, there is proposed a method of adding subparameters on a teleservice layer or correcting some of the existing subparameters. With reference to Table 1 below, a description will now be made of a display method for adding subparameters on a teleservice layer to include, in an SMS message, information indicating that a transmission mobile terminal has a schedule alert function.

TABLE 1

| Field | Length (bits) |
| --- | --- |
| SUBARAMETER_ID | 8 |
| SUBARAMETER_LEN | 8 |
| MSG_ALERT_MODE | 2 |
| MSG_ALERT_TIME_YEAR | 8 |
| MSG_ALERT_TIME_MONTH | 4 |
| MSG_ALERT_TIME_DAY | 4 |
| MSG_ALERT_TIME_HOURS | 4 |
| MSG_ALERT_TIME_MINUTES | 4 |
| MSG_ALERT_TIME_SECONDS | 4 |

Table 1 illustrates subparameters indicating alert and time setting on a teleservice layer. An alert mode parameter MSG_ALERT_MODE, an alert time_year parameter MSG_ALERT_TIME_YEAR, an alert time_month parameter MSG_ALERT_MONTH, an alert time_date parameter MSG_ALERT_TIME_DAY, an alert time_hour parameter MSG_ALERT_TIME_HOURS, an alert time_minute parameter MSG_ALERT_TIME_MINUTES, and an alert time_second parameter MSG_ALERT_TIME_SECONDS are subparameters indicating time and alert setting modes in an SMS message. Items of the time parameters are expressed in two 4-bit BCD (Binary-Coded Decimal) numbers. For example, a year of 1998 is expressed as '1001 1000' before being transmitted. In addition, the alert mode in Table 1 can be set to 4 different modes before being transmitted, as illustrated in Table 2 below.

TABLE 2

| MSG_ALERT_MODE | Function |
| --- | --- |
| 00 | Off |
| 01 | Alarm |
| 10 | Vibration |
| 11 | Reserved |

Referring to Table 2, if an alert mode is set to "Off," an alert mode field MSG_ALERT_MODE is represented by '00', and if the alert mode is set to "Alarm," the alert mode field is represented by '01' before being transmitted along with the SMS message. Further, if the alert mode is set to "Vibration," the alert mode field is represented by '10', and if the alert mode is set to "Reserved," the alert mode field is represented by '11' before being transmitted along with the SMS message.

A description will now be made of a procedure for transmitting schedule alert information using an SMS service when subparameters were previously set as shown in Table 1 and Table 2 in order to transmit an SMS message containing the schedule alert information.

The controller 100 holds an idle state in step 900, and then determines in step 902 whether an SMS menu for performing an SMS function is selected. If it is determined in step 902 that an SMS menu is selected, the controller 100 proceeds to step 904 where it displays SMS menu items as shown in FIG. 11A. Thereafter, the controller 100 determines in step 906 whether a New Message Writing item is selected by a user. If the New Message Writing item is selected, the controller 100 proceeds to step 910. For example, if a "1. New Message Writing" item is selected from the SMS menu items displayed on the screen of FIG. 11A, a Message Writing screen of FIG. 11B is displayed. At this point, the user writes a message indicating a time and a place of the meeting as illustrated in FIG. 11B. If in step 906 it is determined that a New Message Writing item is not selected by a user, the controller 100 proceeds to step 908 to determine whether the user selects a Text Reading or another item, such as those displayed in FIG. 11A.

When the message writing is completed, an Alert Setting item for setting a schedule alert is displayed on the Message Writing screen. Thereafter, if it is determined in step 910 that the message writing is completed, the controller 100 determines in step 912 whether an Alert Setting item for schedule alerting is selected. If the Alert Setting item is selected, the controller 100 proceeds to step 914. Otherwise, the controller 100 proceeds to step 922 where it performs a common SMS message transmission mode. The common SMS message transmission mode transmits a general SMS message rather than transmitting a schedule using an SMS service like the present invention. In this case, most items are set in default and the SMS message can be transmitted without alert setting.

In step 914, the controller 100 displays an Alert Setting screen as shown in FIG. 11C. The user then inputs a date and a time to the Alert Setting screen by consulting the written schedule, and inputs an alert mode. The alert mode can be, divided into 4 types shown in Table 2, and the user can select one of them. Although an example of inputting alert date and time has been described with reference to FIG. 11C, it is also possible to additionally input a schedule lasting time as shown in FIG. 8A.

That is, a transmission mobile terminal's user personally inputs such alert information as an alert time at which a reception mobile terminal will generate an alert tone, and an alert mode, to the Alert Setting screen. If alert setting is completed in step 916, the controller 100 proceeds to step 918, and if a Transmission item is selected in step 918, the controller 100 proceeds to step 920 where it transmits an SMS message containing the set alert information to the reception mobile terminal. At this point, time information and alert mode are generated as the parameters shown in Table 1 and Table 2, and then transmitted along with an SMS message. As a matter of course, the transmitted contents are recorded in a scheduler of the transmission mobile terminal.

Figure 10:
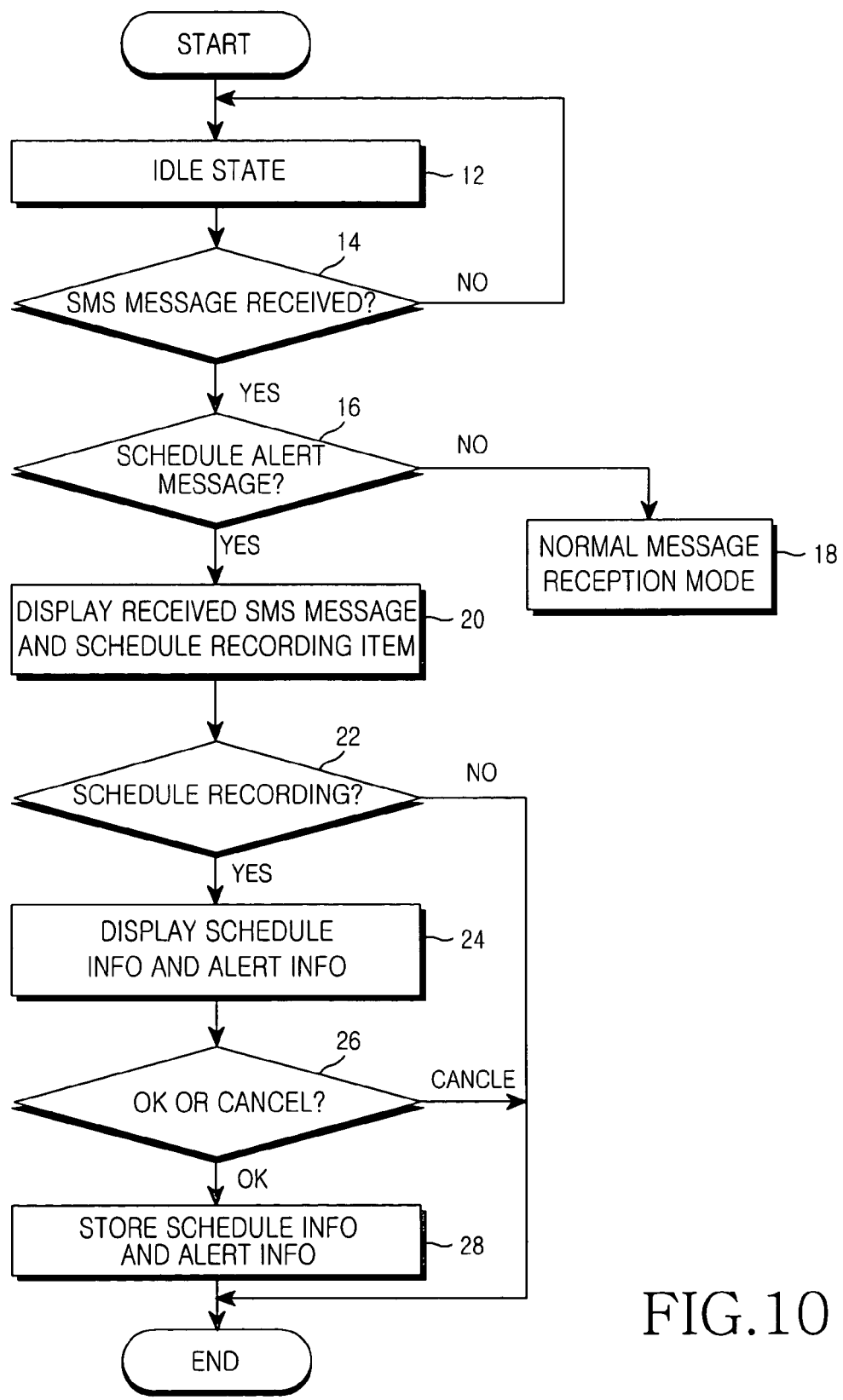
FIG. 10 is a flowchart for recording a schedule message containing schedule information and alert information according to the third embodiment of the present invention.
Figure 12:
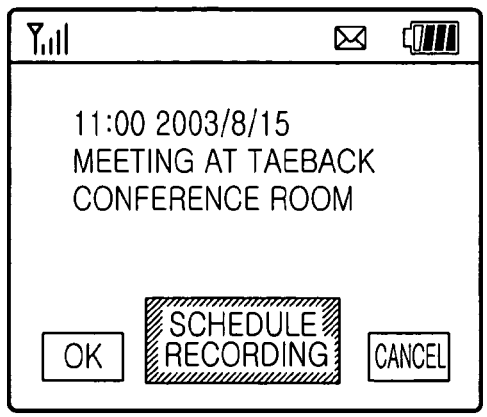
FIGS. 12A to 12C are diagrams illustrating screens for recording a schedule message containing received schedule information and alert information according to the third embodiment of the present invention.
Figure 12:
Figure 12:
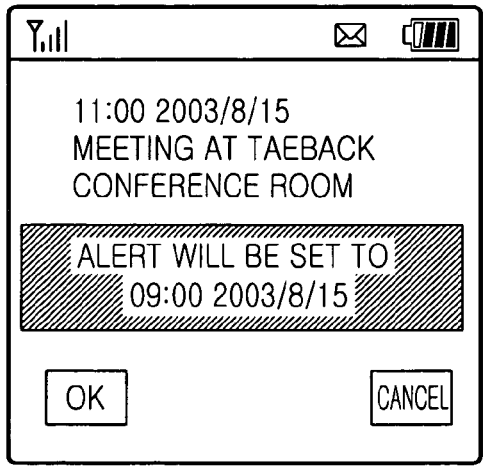
Figure 12:
Figure 12:
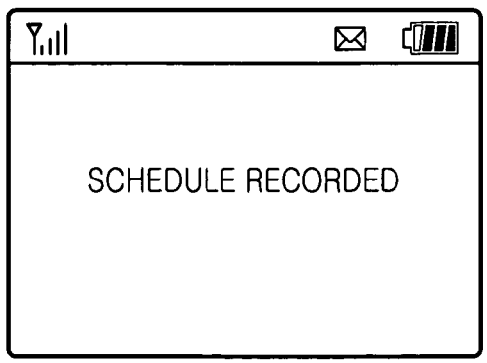

With reference to FIGS. 10 and 12A to 12C, a description will now be made of a procedure for recording received schedule information and alert information in a mobile terminal that receives an SMS message containing the schedule information and alert information mentioned in conjunction with FIG. 9. FIG. 10 is a flowchart for recording a schedule message containing schedule information and alert information according to a third embodiment of the present invention, and FIGS. 12A to 12C illustrate screens for recording a schedule message containing received schedule information and alert information according to a third embodiment of the present invention.

If an SMS message is received in step 14 while the controller 100 holds an idle state in step 12, the controller 100 determines in step 16 whether the received SMS message is a schedule alert message. In the process of determining whether the received SMS message is a schedule alert message, the controller 100 analyzes tag information or determines whether alert information shown in Table 1 and Table 2, being different from the common SMS message, is included. If the received SMS message is a schedule alert message, the controller 100 proceeds to step 20. Otherwise, the controller 100 performs a common message reception mode. In step 20, the controller 100 displays the received SMS message and a Schedule Recording item. In step 20, the Schedule Recording item for straight schedule recording is displayed together with schedule information as illustrated in FIG. 12A.

Thereafter, the controller 100 determines in step 22 whether the Schedule Recording item is selected by the user. If the Schedule Recording item is selected in FIG. 12A, the controller 100 proceeds to step 24 where it displays schedule information and alert information as shown in FIG. 12B. Thereafter, if it is determined in step 26 that an 'OK' button for setting a schedule and an alert is selected, the controller 100 proceeds to step 28 where it stores schedule information and alert information and then displays "Schedule Recorded" on the screen of FIG. 12C. Thus, the user can check an SMS message containing schedule information and alert information, and then record the alert information through the Schedule Recording item.

The embodiment of the present invention has been described with reference to a case where received schedule information and alert information are recorded as received. However, when the Schedule Recording item is selected, the controller 100 may display subitems of 'OK' for recording alert information without modification, 'Modify' for modifying alert information before recording, and "Cancel" for avoiding recording of alert information, thus to perform recording, modification, and recording refusal at the discretion of the user. In addition, though not illustrated in FIG. 10, the mobile terminal receiving an SMS message containing schedule alert information transmits a response message to a mobile terminal that transmitted the SMS message, so that the transmission mobile terminal's user can determine whether transmission was normally performed, by analyzing the response message.

As described above, the present invention can transmit a schedule message using an SMS service, and record a received schedule message as a schedule. In addition, the invention displays the recorded schedule on an external window according to its lasting time, so that the user can conveniently check the schedule.

While the preferred embodiments of the present invention have been illustrated and described, it will be understood by those skilled in the art that various changes and modifications may be made, and equivalents may be substituted for elements thereof without departing from the true scope of the present invention. For example, although the present invention has been described with reference to the case where one schedule is transmitted to a plurality of mobile terminals and then recorded therein, a plurality of schedules can also be transmitted to a plurality of mobile terminals at once. Therefore, it is intended that the present invention not be limited to the particular embodiment disclosed as the best mode contemplated for carrying out the present invention; instead, it is intended that the present invention include all embodiments falling within the scope of the appended claims.

As described above, in the present invention, when a plurality of users have a common schedule, one user transmits a recorded schedule to the other users' mobile terminals using an SMS service, and the mobile terminals receiving the transmitted schedule can directly store the schedule message in a scheduler of the mobile terminals. Therefore, when one group has a schedule having common contents, each member of the group does not need to separately input the schedule, contributing to the convenience of the users in schedule recording. In addition, since a schedule is transmitted with its alert function being set, a mobile terminal's user receiving the schedule can protect schedule information by performing a function of generating an alert tone by itself at a predetermined time through only a simple checking process and notifying the contents.

Moreover, the invention modifies or adds data desired to be transmitted to a reception mobile terminal, and the contents of a brief memorandum desired to be included in a scheduler in addition to the contents seen in an SMS service in schedule time information, before transmission, and enables the reception mobile terminal to store data and set an alert in association with a PIM function, contributing to a convenience of the user. In addition, the invention can increase efficiency of an external window by displaying recorded schedule information on the external window at the user's discretion.

What is claimed is:

1. A schedule transmission method in a mobile terminal having a short message service (SMS) function and a schedule function, the method comprising the steps of:
   determining, by a controller, whether a schedule transmission input for transmitting a schedule recorded in the mobile terminal to an other mobile terminal is selected by a user; and
   if the schedule transmission input is selected, converting, by the controller, a data format of the schedule into a data format of a schedule-recordable SMS message for recording in a scheduler,
   wherein the data format of the schedule-recordable SMS message is in a format of a message that can be directly recorded as a schedule item in the scheduler; and
   transmitting, by the controller, the schedule-recordable SMS message to said other mobile terminal,
   wherein the data format of the schedule-recordable SMS message includes parameters indicating use of an alert tone for the schedule and a type of the alert tone.

2. The schedule transmission method of claim 1, wherein the converting step further comprises repeatedly transmitting the schedule-recordable SMS message to a plurality of other mobile terminals when transmitting the schedule-recordable SMS message to the other mobile terminal.

3. The schedule transmission method of claim 1, wherein the data format of the schedule-recordable SMS message obtained by converting the data format of the schedule comprises a parameter distinguishing whether a corresponding message is a common SMS message or a schedule-recordable SMS message.

4. The schedule transmission method of claim 1, wherein the data format of the SMS message obtained by converting the data format of the schedule comprises a parameter identifying a number of recipients to which the schedule is to be transmitted.

5. The schedule transmission method of claim 1, wherein the data format of the SMS message obtained by converting the data format of the schedule comprises parameters indicating a length of the schedule contents, an alert date and a time information of the schedule to be recorded.

6. A schedule recording method in a mobile terminal having a short message service (SMS) message reception function and a schedule function, the method comprising the steps of:
   upon receiving an SMS message, determining, by a controller, whether the received SMS message is a schedule-recordable SMS message;
   if the received SMS message is a schedule-recordable SMS message, determining, by the controller, whether a schedule recording key is input; and
   if the schedule recording key is input, recording a schedule information of the schedule-recordable SMS message in a scheduler;
   wherein a data format of the schedule-recordable SMS message includes parameters indicating use of an alert tone for the schedule information and a type of the alert tone.

7. A schedule transmission method in a mobile terminal, comprising the steps of:
   if a schedule message transmission input for schedule recording to other mobile terminals is selected by a key input, converting, by a controller, a data format of a schedule into a data format of a schedule-recordable SMS message, and transmitting the schedule-recordable SMS message to the other mobile terminals; and
   upon receiving the schedule-recordable SMS message by another mobile terminal, recording, by a controller of the another mobile terminal, schedule information of the received schedule-recordable SMS message as a schedule if a schedule recording input is selected by a key input of the another mobile terminal;
   wherein a data format of the schedule-recordable SMS message includes parameters indicating use of an alert tone for the schedule and a type of the alert tone.

8. The schedule transmission method of claim 7, wherein the schedule message is transmitted using an SMS message service.

9. The schedule transmission method of claim 8, wherein the data format of the SMS message obtained by converting the data format of the schedule comprises an identifier for distinguishing whether a corresponding message is a common SMS message or a schedule-recordable SMS message.

10. The schedule transmission method of claim 8, wherein the data format of the SMS message obtained by converting the data format of the schedule includes a tag indicating a schedule subject, a date, a time, contents, a schedule lasting time, or a phone number of the other party.

11. The schedule transmission method of claim 8, wherein the recording step further comprises:
   upon receiving an SMS message, if the received SMS message is a schedule-recordable message, determining whether a schedule recording key is input; and
   if the schedule recording key is input, converting a data format of the received SMS message into a format recordable in a scheduler and recording the converted data in the scheduler.

12. The schedule transmission method of claim 8, wherein the recording step further comprises:
- upon receiving an SMS message, if the received SMS message is a schedule-recordable message, determining whether a schedule recording key is input; and
- if the schedule recording key is input, recording the schedule including alert information of the received SMS message.

13. The schedule transmission method of claim 12, wherein the step of recording the schedule containing alert information of the received SMS message comprises:
- analyzing a schedule contents, an alert mode, and an alert time by consulting data of a data field of the received SMS message; and
- recording the analyzed schedule contents, alert mode and alert time in the scheduler.

14. The schedule transmission method of claim 12, wherein the step of recording the schedule containing alert information of the received SMS message comprises:
- checking the schedule by analyzing a preset tagged text for schedule recording in the received SMS message; and
- recording the checked schedule.

15. The schedule transmission method of claim 7, wherein the schedule message is transmitted using an E-mail over the Internet.

16. The schedule transmission method of claim 15, wherein the transmitting step further comprises:
- determining whether the schedule message transmission input for transmitting an SMS message containing schedule information and alert information to an other mobile terminal is selected by the user; and
- if the schedule message transmission input is selected, converting a data format of the SMS message into a data format of a schedule-recordable SMS message, and transmitting the schedule-recordable SMS message to said other mobile terminal.

17. The schedule transmission method of claim 16, wherein the step of converting the data format of the SMS message into the data format of the schedule-recordable SMS message comprises dividing a data field of an SMS message into a subparameter ID (identifier), a subparameter length, an alert mode, an alert time_year, an alert time_month, an alert time_date, an alert time_hours, an alert time_minutes, and an alert time_seconds according to a corresponding schedule, so as to enable the other mobile terminal to be able to record the SMS message as a schedule.

18. The schedule transmission method of claim 7, further comprises recording the received schedule message in a scheduler and then displaying the recorded schedule on an external window if an input for displaying the recorded schedule on the external window is selected by the user.

19. The schedule transmission method of claim 18, wherein the step of displaying the recorded schedule on an external window comprises comparing a lasting time of the recorded schedule with a current time, displaying a corresponding schedule on the external window if a date and a time are identical to the current time, and avoiding displaying the corresponding schedule if the time and the lasting time have elapsed.

* * * * *